United States Patent [19]

Blach et al.

[11] Patent Number: 4,586,219

[45] Date of Patent: May 6, 1986

[54] TORQUE-SPLITTING PINION GEAR FOR TWIN-SCREW MACHINES

[76] Inventors: Josef A. Blach, Wilhelmstrasse 24, D - 7144 Asperg; Rudolf P. Fritsch, Goslarer Strasse 58, D - 7000 Stuttgart 31, both of Fed. Rep. of Germany

[21] Appl. No.: 459,322

[22] Filed: Jan. 20, 1983

[30] Foreign Application Priority Data

Jan. 22, 1982 [DE] Fed. Rep. of Germany ....... 3201952

[51] Int. Cl.4 ..................... F16H 57/00; F16H 37/06; B21C 23/00; B28C 1/16
[52] U.S. Cl. ........................................ 74/410; 74/411; 74/413; 74/665 G; 74/665 F
[58] Field of Search .................. 74/410, 413, 411, 421, 74/665 G, 665 GA, 665 GD, 665 F; 72/262, 449; 366/83, 85

[56] References Cited

U.S. PATENT DOCUMENTS

| | | | |
|---|---|---|---|
| 2,567,482 | 9/1951 | Hoffman et al. | 74/410 |
| 2,943,506 | 7/1960 | Thumin | 74/665 GA |
| 2,956,451 | 10/1960 | Bowman | 74/410 |
| 2,982,144 | 5/1961 | Wallgren | 74/410 |
| 3,499,343 | 3/1970 | Burkhardt et al. | 74/410 |
| 3,766,797 | 10/1973 | Hanslik et al. | 74/410 |
| 3,772,934 | 11/1973 | Warren | 74/410 |
| 3,805,633 | 4/1974 | Bacher et al. | 74/411 |
| 3,824,875 | 7/1974 | Willert et al. | 74/665 GA |
| 4,136,580 | 1/1979 | Brand et al. | 74/410 |
| 4,170,150 | 10/1979 | Selbach et al. | 74/410 |
| 4,197,758 | 4/1980 | Tetard | 74/410 |
| 4,253,345 | 3/1981 | Münster | 74/665 GA |
| 4,261,225 | 4/1981 | Zahradnik | 74/665 GA |
| 4,297,917 | 11/1981 | Bauer et al. | 74/665 GA |
| 4,315,440 | 2/1982 | Chszaniecki | 74/410 |
| 4,399,719 | 8/1983 | Chszaniecki et al. | 74/410 |

FOREIGN PATENT DOCUMENTS

| | | | |
|---|---|---|---|
| 211108 | 1/1957 | Australia | 74/410 |
| 2025162 | 12/1971 | Fed. Rep. of Germany | |

Primary Examiner—Lawrence J. Staab
Assistant Examiner—Michael D. Bednarek
Attorney, Agent, or Firm—Shenier & O'Connor

[57] ABSTRACT

Torque-splitting pinion gear for twin-screw machines comprising a first, direct-driven screw shaft, which has an output pinion meshing with a drive pinion provided on a coupling shaft, and also comprising a drive pinion provided on the second screw shaft, this pinion being axially offset towards the front relative to the output pinion of the first screw shaft and being drivable via an output pinion of the coupling shaft.

In order to simplify such a gear and to optimize the driving of the two screw shafts the following features are used in combination:

The output pinion of the coupling shaft meshes directly with the drive pinion of the second screw shaft; the coupling shaft is designed as a torsion bar; at least one of the pinions is rotatable and lockable in position relative to its shaft; the torsion resistance of the coupling shaft and the transmission ratio between first screw shaft, coupling shaft and second screw shaft are adjusted to the torsion resistance of the section of the first screw shaft lying between the output pinion of the first screw shaft and the drive pinion of the second screw shaft such that both screw shafts are always in proper phase relation with each other.

8 Claims, 5 Drawing Figures

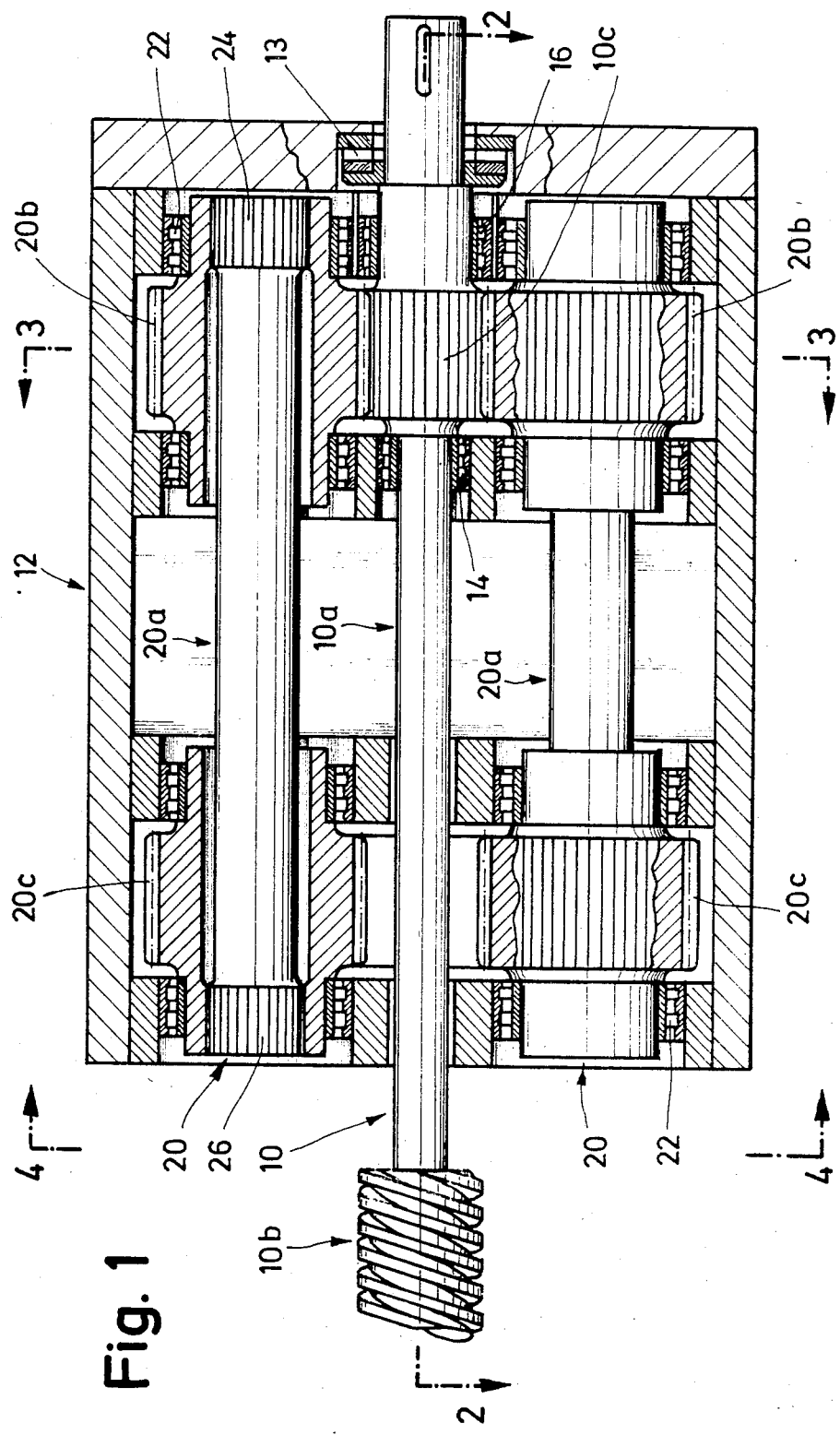

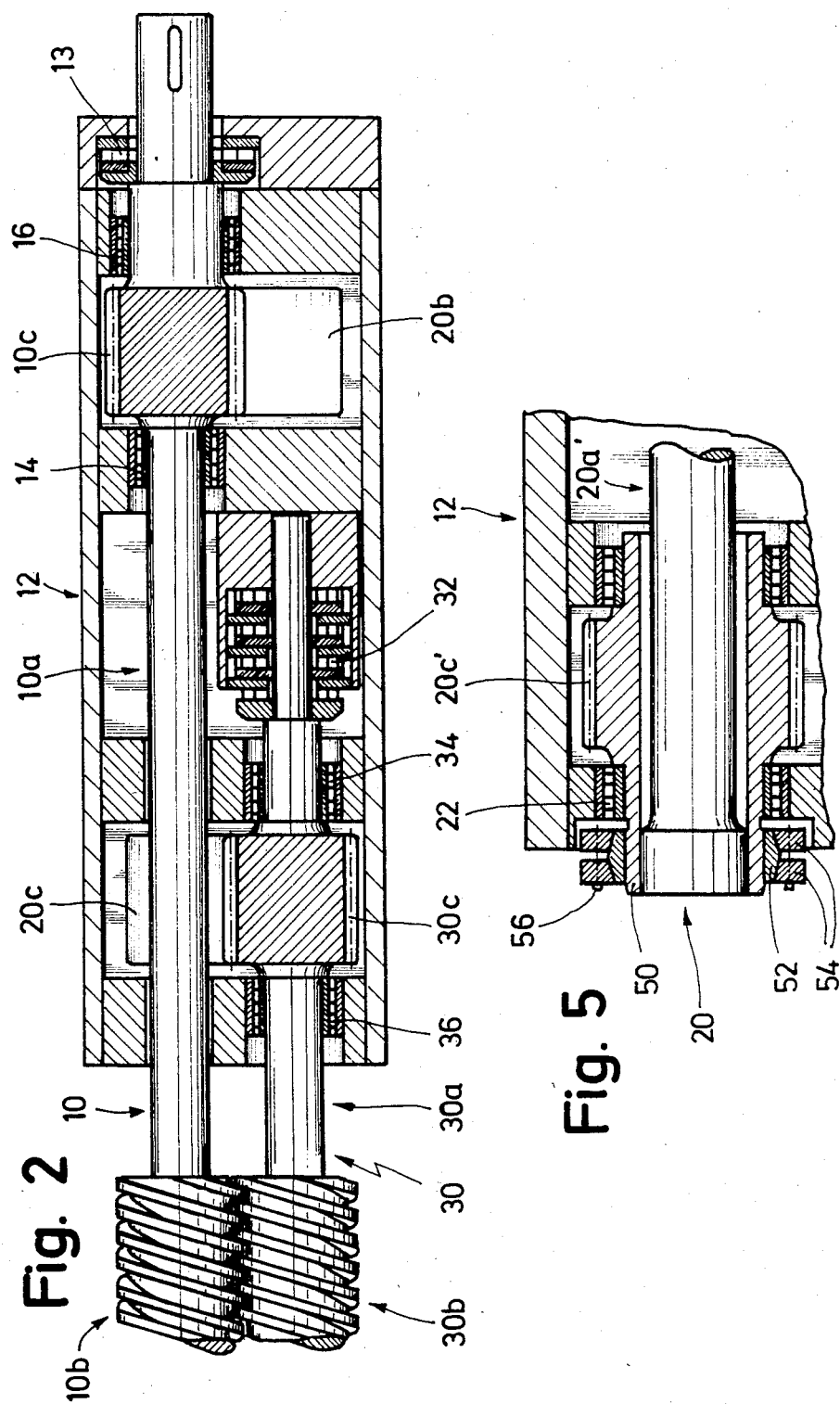

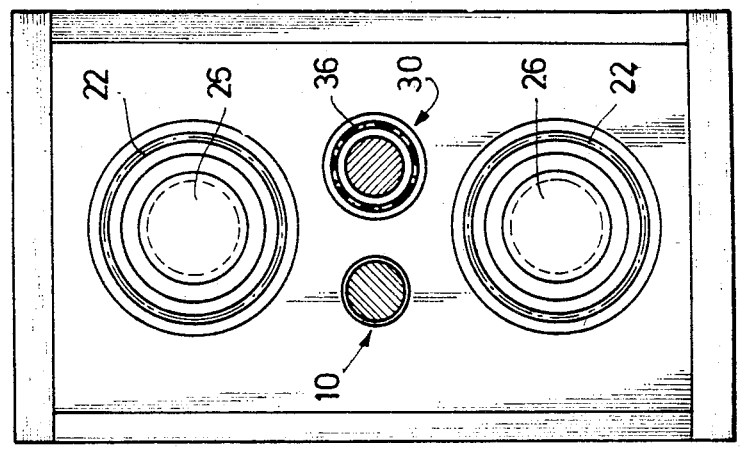
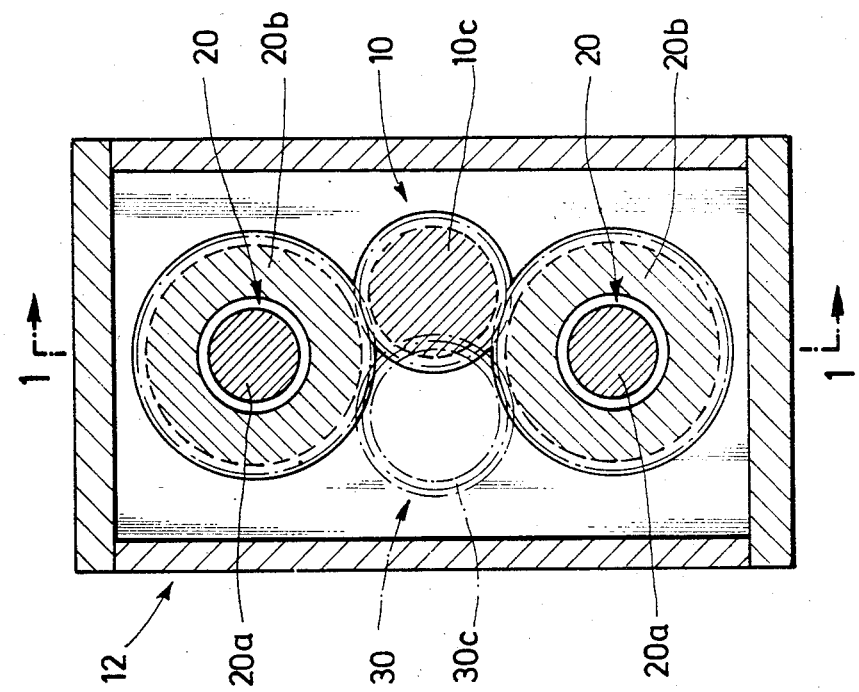

TORQUE-SPLITTING PINION GEAR FOR TWIN-SCREW MACHINES

The invention relates to a torque-splitting pinion gear for twin-screw machines, comprising a direct-driven first screw shaft having a screw section, this shaft having an output pinion meshing with a drive pinion provided on a coupling shaft, which is parallel to the first screw shaft and designed as a torsion bar, and also comprising a second screw shaft parallel to the first screw shaft, the second screw shaft having a drive pinion drivable via an output pinion of the coupling shaft and axially offset relative to the output pinion of the first screw shaft towards its screw section.

The invention relates in particular to gears of this type for twin-screw machines, the screw shafts of which engage with each other, i.e. intermesh, and are driven in the same direction. Such twin-screw machines are used, for example, for the processing of plastics materials, for the mixing of materials or for the mastication of plastic or pasty materials.

The screw shafts of all these twin-screw machines require considerable driving torque. For this reason engineers are confronted with the problems of not only applying the same driving torque to both screw shafts but also of always driving them in proper phase relation with each other, in particular when the screw sections of the two screw shafts mesh with each other. In addition, it is difficult to control the radial and axial bearing forces for the two screw shafts. The solution to these problems is made more difficult by the small spacing between the two intermeshing screw shafts. For this reason known gears of the type described at the beginning have a relatively expensive construction without any satisfactory solution to the problems having as yet been found.

For example, the gear of the type described at the beginning, which is known from German laid-open paper DE-OS No. 20 25 162, has two intermediate shafts each provided with a pinion and each placed between one of two coupling shafts, which are disposed symmetrically to the plane defined by the axes of the two screw shafts, and the drive pinion of the second screw shaft. The pinions of the intermediate shafts mesh with the drive pinion of the second screw shaft and an output pinion of the associated coupling shaft. Apart from the expense caused by the two intermediate shafts with their associated bearings it is not possible in the case of this known gear and with acceptable requirements as to manufacturing precision always to obtain even loading of the two pinions of the intermediate shafts which mesh with the drive pinion of the second screw shaft or rotation of the two screw shafts in proper phase relation with each other. In connection with the last disadvantage it is to be noted that, in the case of the known construction, the drive pinion of the second screw shaft is axially offset relative to the output pinion of the first screw shaft such that the latter shaft has a section of shaft between its screw section and its output pinion, which is substantially longer than the section of shaft between the screw section and the drive pinion of the second screw shaft. Such axial offsetting is necessary, amongst other reasons, because the small spacing between the axes of the two screw shafts requires the rear bearings of the two screw shafts to be axially offset. Consequently, the first screw shaft of the known construction is twisted between its output pinion and its screw section at a greater angle than that part of the second screw shaft, which lies between its drive pinion and its screw section, due to the considerable driving torque of the two screw shafts.

The same applies for the torque-splitting pinion gear for twin-screw machines according to German patent publication DE-AS No. 28 56 068, with which the first screw shaft drives the second screw shaft via a coupling shaft and two intermediate shafts, these two intermediate shafts also being of different constructions.

Both known constructions have the disadvantage that not only the pinions of the two screw shafts but also the drive and output pinions of the coupling shaft or shafts are of differing constructions.

The object underlying the invention was to create a torque-splitting pinion gear for twin-screw machines, with which an optimum driving of the two screw shafts may be achieved and manufacturing costs kept low. Proceeding on the basis of a gear of the type described at the beginning this object is accomplished according to the invention in that the output pinion of the coupling shaft meshes directly with the drive pinion of the second screw shaft, that at least one of the pinions is rotatable and lockable in position relative to its shaft and that the torsion resistance of the coupling shaft and the transmission ratio between first screw shaft, coupling shaft and second screw shaft are adjusted to the torsion resistance of the section of the first screw shaft lying between the output pinion of the first screw shaft and the drive pinion of the second screw shaft such that both screw shafts are always in proper phase relation with each other.

The gear according to the invention, in comparison with the known construction, therefore dispenses with one shaft together with two sets of teeth and associated bearings. In addition, the requirements with regard to production precision are reduced since the gear may be adjusted with the aid of the adjustable pinion and, due to the fact that the gear is adjusted, according to the invention, to the torsion resistance of the first screw shaft, it is finally possible to have the two intermeshing screw shafts always running in proper phase relation with each other.

In the case of a preferred embodiment of the gear according to the invention two identically constructed coupling shafts are provided, which are symmetrically disposed to the plane defined by the axes of the two screw shafts and spaced at the same distance from these axes, their drive and output pinions all having the same construction. This not only allows especially large torque to be introduced to the two screw shafts but also makes it possible simultaneously for the radial stresses on the bearings of the second screw shaft in the area of its drive pinion to be virtually neutralized; this is, indeed, also the case for the two known gears described above but these necessitate substantially higher manufacturing costs since coupling shafts, which have pinions and bearings of differing constructions, as well as additional intermediate shafts are used.

If the gear according to the invention is designed such that both pinions of the coupling shaft or shafts are rotatable and lockable in position relative to their shaft bodies it is easy to achieve a further advantage: The pinions of the coupling shaft can then have bearings on both sides without the system being statically redundant in determination whereas the known gear according to DE-AS No. 28 56 068, with integral intermediate shafts, allows only two bearings to be used for each of these intermediate shafts.

Additional features, advantages and details of the invention are shown in the attached claims and/or the following description as well as in the attached drawings illustrating a preferred embodiment of the construction according to the invention and a variation of the same. The drawings show:

FIG. 1 a first longitudinal section through the gear (section taken along line 1—1 in FIG. 3);

FIG. 2 a further longitudinal section taken along line 2—2 in FIG. 1;

FIGS. 3 and 4 cross sections through the gear taken along lines 3—3 or 4—4 in FIG. 1;

FIG. 5 a variation of the connecting arrangement between the pinions of the coupling shaft and the shaft body designed as a torsion bar.

The gear illustrated in the drawings has a housing 12, in which a first screw shaft designated as a whole as 10 is rotatably mounted by means of a thrust bearing 13 as well as two radial bearings 14 and 16. This shaft consists essentially of a drive shaft section 10a and a screw section 10b as well as an output pinion 10c, which is disposed on the drive shaft section 10a and is, in particular, integral with this section.

In addition, two coupling shafts 20 are disposed in the housing 12, these coupling shafts being constructed completely identically and also being identically mounted. The coupling shafts 20 each consist of a shaft body 20a designed as a torsion bar or rod and two pinions designed as hollow bodies, i.e. a drive pinion 20b and an output pinion 20c. These pinions are supported on both sides in the housing 12 by means of bearings 22.

In the first embodiment splines 24 and 26 serve to connect the pinions 20b or 20c with the shaft body 20a such that they cannot rotate relative to said shaft body. According to the invention the number of teeth in the two sets of splines will differ by "1". By withdrawing the pinions 20b, 20c from the shaft body 20a in an axial direction and turning the pinions relative to the shaft body the angular position of the two pinions relative to each other may be altered not only in accordance with the spacing of one of the two sets of splines 24, 26 but also by the smallest angles of rotation.

In the embodiment according to FIG. 1 the two shaft bodies 20a must, of course, be secured in an axial direction by means not shown here.

As shown in FIGS. 1 and 3 the output pinion 10c drives the two drive pinions 20b of the coupling shafts while their output pinions 20c mesh with the drive pinion 30c of a second screw shaft 30 which is supported in the housing 12 by a thrust bearing 32 and two radial bearings 34, 36 and consists essentially of a drive shaft section 30a and a screw section 30b.

According to the invention the drive pinion 30c is formed integrally with the drive shaft section 30a, as is also the case for the first screw shaft 10.

The intermeshing screw sections 10b and 30b will therefore be driven in the same direction and since they mesh together care is to be taken that the sychronous running and inphase position of the two screw sections relative to each other are guaranteed even when the load on them changes due to the material to be worked.

Since the driving torque applied by the gear according to the invention to the drive shaft section 10a of the first screw shaft 10 is to be transferred equally to the screw section 10b and the screw section 30b, i.e. 50% to each, it is suggested in accordance with a special feature of the invention that the diameter of the drive shaft section 10a to the right and left (according to FIG. 1) of the output pinion 10c be selected such that the cross-sectional faces are in a ratio of approximately 2:1.

In order for the radial components of the forces exerted by the two output pinions 20c on the drive pinion 30c virtually to compensate each other the two coupling shafts 20 are disposed, relative to the axis of the second screw shaft 30, in mirror image relative to the plane defined by the two screw shaft axes, as shown in FIGS. 3 and 4.

The use of identical coupling shafts 20 has the advantage that the two shaft bodies 20a will be twisted in the same way.

Finally, the construction of the shaft bodies 20a as torsion bars enables each of the pinions 20b and 20c to be supported by means of two bearings 22 without the system being statically redundant in determination.

The embodiment described and illustrated makes it clear that it is possible to manage with a minimum of different constructional elements and that the requirements set on precision manufacture need not be nearly so high as was the case for the known gears of the type in question.

FIG. 5 shows a different type of connection between the shaft bodies of the coupling shafts and their pinions. In this embodiment a clamping joint is provided between the shaft body 20a' and a shoulder 50 of the pinion 20c', this joint consisting of a conical ring 52 and two locking rings 54, which can be drawn together in axial direction by means of screws 56 and thus result in a reduction in the diameter of the conical ring 52. Whereas the first embodiment has a positive connection, the pinions of the second embodiment are non-positively connectable with the shaft bodies 20a'.

The correct position of the two screw shafts relative to each other, i.e. always at the right angle of rotation after adjustment of the gear independent of the size of the driving torque, is achieved when the following conditions are fulfilled for a gear, with which the drive shaft section 10a of the first screw shaft 10 and the shaft body 20a of the coupling shaft 20 or shafts consist of a steel:

$$\frac{L_K}{n \cdot I_{t(K)}} \cdot \frac{Z_K}{Z_{s1}} = \frac{L_{s1}}{I_{t(s1)}}$$

wherein
 $L_k$ = length of the torsionally loaded shaft body of the coupling shaft(s)
 $L_{s1}$ = length of the torsionally loaded drive shaft section of the first screw shaft
 n = number of coupling shafts
 $I_{t(K)}$ = polar moment of inertia of the twisted coupling shaft body
 $I_{t(s1)}$ = polar moment of inertia of the twisted drive shaft section of the first screw shaft
 $Z_K$ = number of teeth of the drive pinion of the coupling shaft(s)
 $Z_{s1}$ = number of teeth of the output pinion of the first screw shaft

Having thus described our invention, what we claim is:

1. A torque-splitting gear assembly for twin-screw machines, comprising a direct-driven first screw shaft having a screw section (10b), a coupling shaft (20) parallel to said first screw shaft, said coupling shaft designed as a torsion bar, a first output pinion (10c) on said first screw shaft, a first drive pinion (20b) on said coupling shaft, said first drive pinion meshing with said first output pinion, a second screw shaft (30) parallel to the first screw shaft, said second screw shaft having a screw section (30b), a second drive pinion (30c) on said second screw shaft, a second output pinion (20c) on said coupling shaft, said second drive pinion meshing with said second output pinion, said second drive pinion being axially offset relative to said first output pinion towards the screw section (10b) of the first screw shaft, characterized in that the torsion resistance of the coupling shaft (20) and the transmission ratio between the first screw shaft, coupling shaft and second screw shaft are adjusted to the torsion resistance of a section of the first screw shaft lying between the output pinion (10c) of the first screw shaft and the drive pinion (30c) of the second screw shaft such that both screw shafts (10, 30) are always in a predetermined phase relation with each other, that at least one of said pinions (10c, 20b, 20c, 30c) is rotatable and lockable in position relative to its shaft, that said first output pinion (10c) and said second drive pinion (30c) have the same diameter, that said first drive pinion (20b) and said second output pinion (20c) have the same diameter, and that two identical coupling shafts (20) are provided, said coupling shafts being symmetrically disposed with relation to the plane defined by the axes of the two screw shafts (10,30) and being spaced the same distance from said axes.

2. A gear assembly as in claim 1 characterized in the provision of radial bearings (14,16) disposed on both sides of said first output pinion and in the provision of a thrust bearing for the first screw shaft, said thrust bearing being disposed on a side of said radial bearings facing away from the screw section (10b) of the first screw shaft.

3. Gear according to claim 1, characterized in that the output pinion (10c) of the first (10) and the drive pinion (30c) of the second-screw shaft (30) are integrally formed with their respective shafts (10 or 30).

4. Gear according to claim 1, characterized in that the cross section of the first screw shaft (10), on the side of its output pinion (10c) facing its screw section (10b), is approximately in the ratio of 1:2 relative to its cross section on the other side of said pinion.

5. Gear according to claim 1, characterized in that the two pinions (20b, 20c) of the coupling shaft (20) are rotatable and lockable in position relative to the shaft body (20a).

6. Gear according to claim 5, characterized in that the coupling shaft (20a) has external teeth (24, 26) for each of its pinions (20b, 20c), the respective pinion fitting with internal teeth onto said external teeth, and that the sets of teeth (24, 26) for the two pinions have a differing number of teeth, this number varying in particular by "1".

7. Gear according to claim 5, characterized in that the pinions (20b, 20c) of the coupling shaft (20) each have bearings on both sides.

8. Gear according to claim 6, characterized in that the pinions (20b, 20c) of the coupling shaft (20) each have bearings on both sides.

* * * * *